June 28, 1955  R. SEIDL  2,711,603
MANNEQUIN

Filed Feb. 12, 1952  3 Sheets-Sheet 1

Rudolph Seidl
INVENTOR.

June 28, 1955     R. SEIDL     2,711,603
MANNEQUIN
Filed Feb. 12, 1952     3 Sheets-Sheet 2
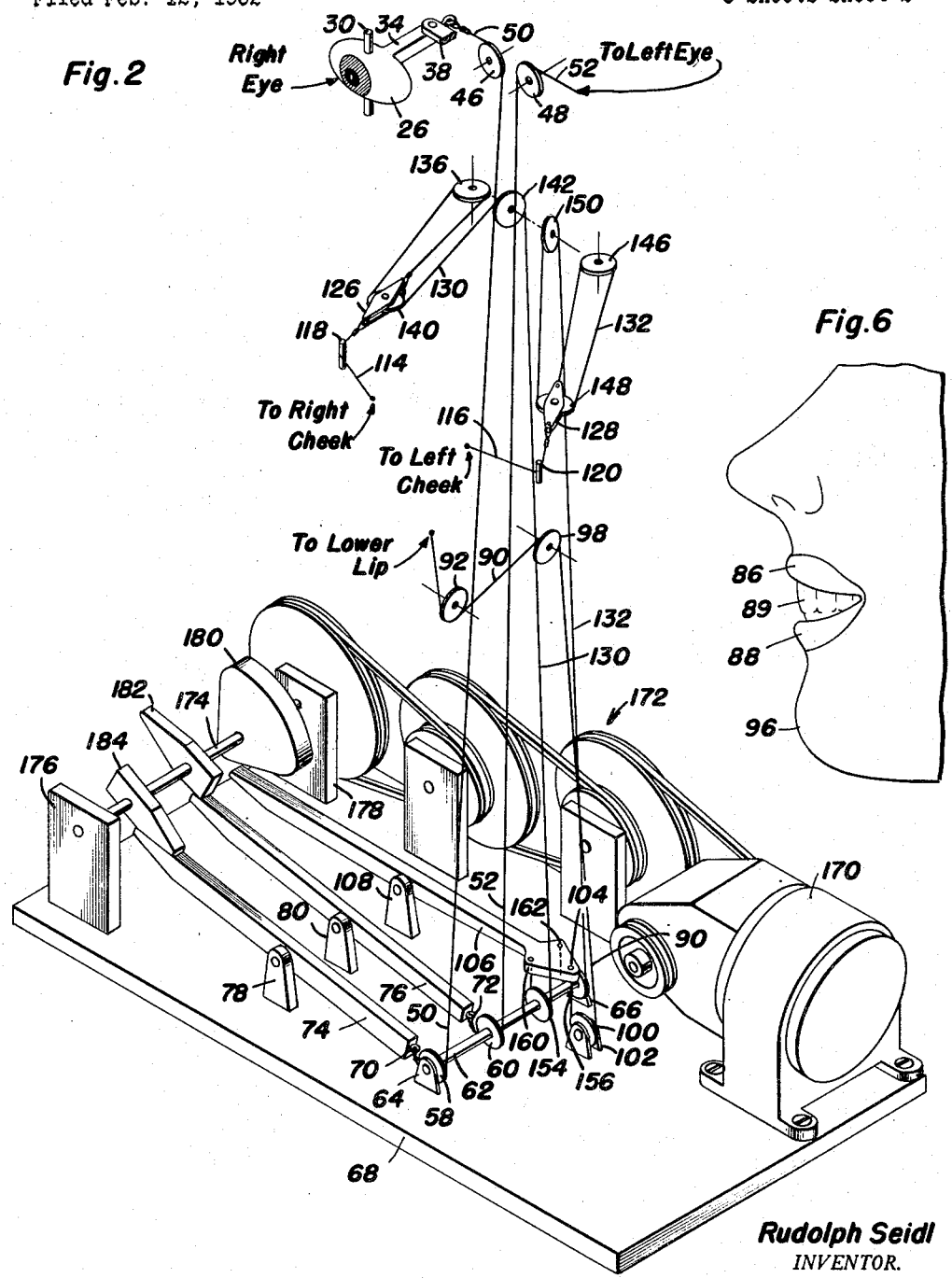
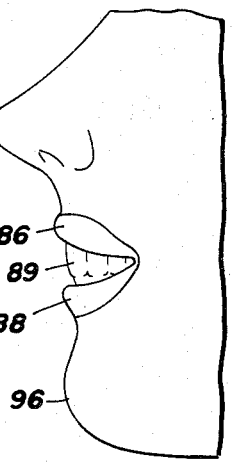
Fig.6
Rudolph Seidl
*INVENTOR.*

June 28, 1955  R. SEIDL  2,711,603
MANNEQUIN

Filed Feb. 12, 1952  3 Sheets-Sheet 3

Rudolph Seidl
INVENTOR.

BY Clarence A. O'Brien
and Harvey B. Jacobson
Attorneys

United States Patent Office 2,711,603
Patented June 28, 1955

2,711,603

MANNEQUIN

Rudolph Seidl, Council Bluffs, Iowa

Application February 12, 1952, Serial No. 271,099

5 Claims. (Cl. 40—126)

This invention relates to a mannequin and particularly to a mannequin having means for changing the facial expression thereof.

In advertising and display work, it is frequently desirable to use mannequins to show the material or suggest ideas. Mannequins that move or change their facial expressions in a natural manner are very much desirable for such work.

The present invention provides a mannequin having a simulated skin with means for producing motion of the skin to change the facial expression of the mannequin. Also, the mannequin is provided with movable eyes with means for periodically oscillating the eyes to change the expression or manner of the mannequin.

It is accordingly an object of this invention to provide an improved mannequin.

It is a further object of this invention to provide a mannequin having changeable facial expressions.

It is a further object of this invention to provide attachments for changing the facial expression of a mannequin.

It is a further object of this invention to provide a mannequin having simulated skin with cord connections thereto and power means for tensioning the cords.

It is a further object of this invention to provide a mannequin which changes expressions in a natural manner.

Other objects and many of the attendant advantages of this invention will be apparent from the following detailed description taken in conjunction with the accompanying drawings, in which:

Figure 2 is a schematic perspective of the operating mechanism, showing position and manner of operating the various components of the mannequin.

Figure 1:
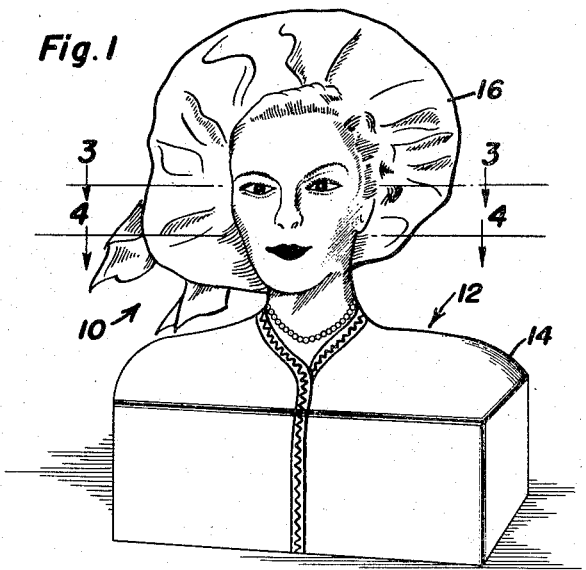
Figure 1 is a perspective view of the mannequin in normal position.
Figure 3:
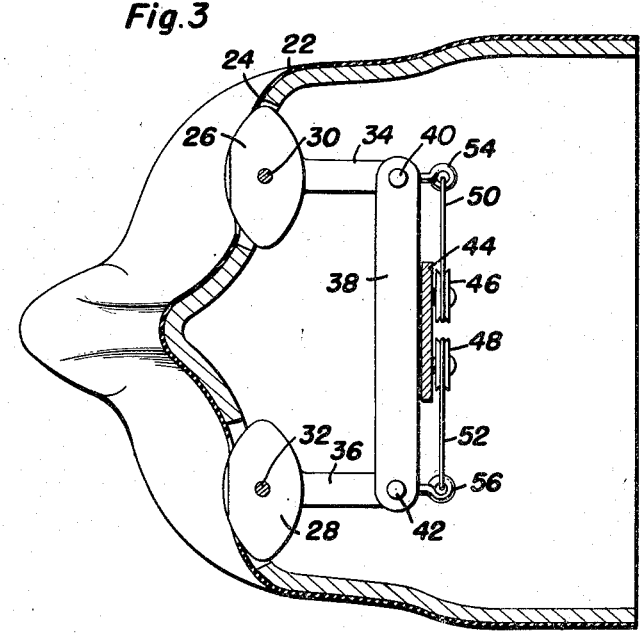
Figure 4:
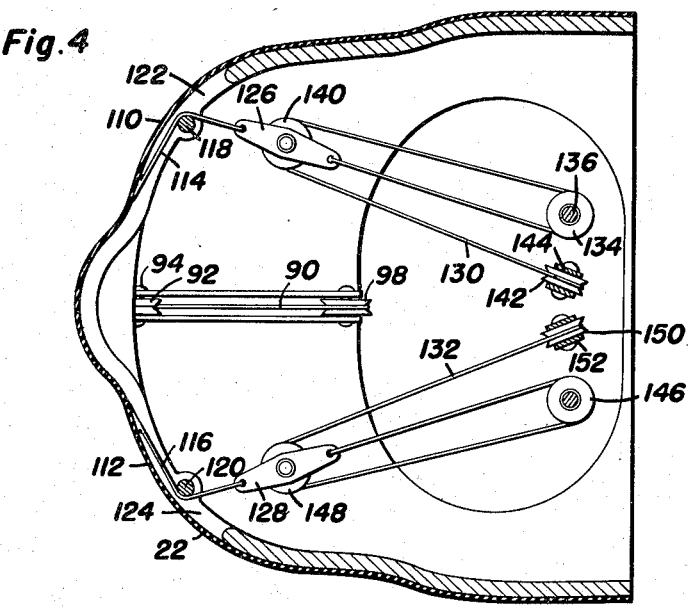
Figure 5:
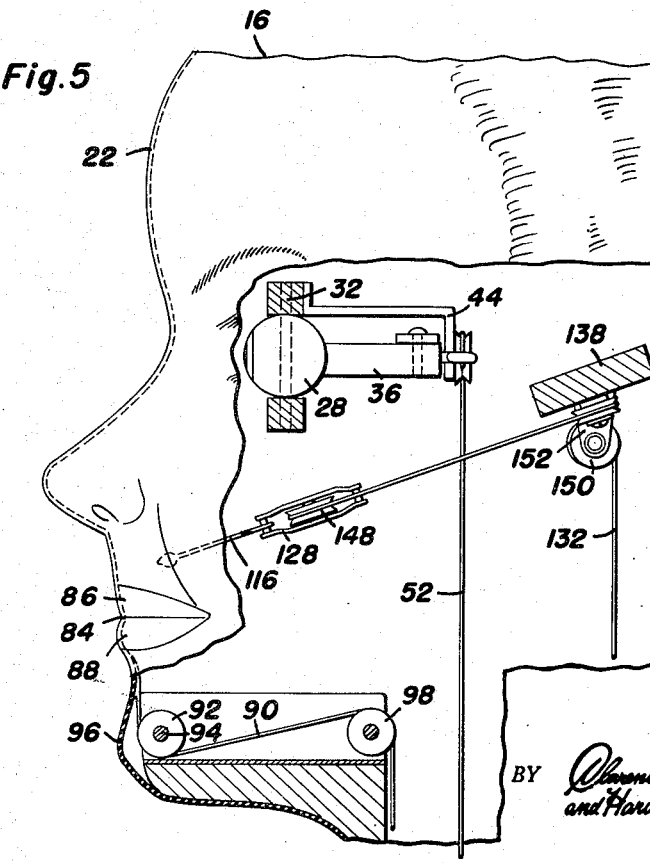

Figrue 3 is a cross section taken substantially on the plane indicated by the line 3—3 of Figure 1 and showing the operative mounting for the simulated eyes;

Figure 4 is a cross section taken substantially on the plane indicated by the line 4—4 of Figure 1 and showing the power multiplying connection to the cheeks of the mannequin;

Figure 5 is a side view, with parts broken away and in section, showing the smile connection; and Figure 6 is an enlarged fragmentary view showing the smile.

In the exemplary embodiment of the invention, the mannequin 10 is provided with a hollow body 12, the lower portion 14 of which simulates at least a portion of a human body. The top portion of the hollow body simulates a head and neck of a human figure and particularly the face thereof. At least the face portion 20 of the mannequin 10 is provided with a simulated skin 22 constructed of a flexible resilient material having the color and texture of human skin. The face is provided with a pair of eye openings 24, in which are mounted simulated eyes 26 and 28 which are pivotally mounted on pins 30 and 32. The simulated eyes 26 and 28 have rearwardly extending projections 34 and 36 which are connected together for simultaneous operation by a cross bar 38 pivoted to the projection 34 and 36 by pins 40 and 42 mounted on a bracket 44 within the head 16 and a pair of sheaves 46 and 48 mounted substantially parallel to the cross bar 38 and mounting cord means 50 and 52 which extend to eye screws 54 and 56 mounted in the rear end of the projections 34 and 36. The cord means 50 and 52 which extend downwardly through the hollow body are entrained on sheaves 58 and 60 freely mounted on a sheeve shaft 62 which is journaled on ears 64 and 66 mounted on a base 68 within the body 14 of the mannequin. The ends of the cords 50 and 52 are connected respectively to eye screws 70 and 72 in the ends of operating levers 74 and 76 which are pivotally mounted on upstanding lugs 78 and 80 mounted on the base 68. The levers 74 and 76 are operated by means presently to be described.

The simulated skin 22 is made discontinuous at the parting line 84 of the lips 86 and 88. As best shown in Figures 4 and 5, recesses are provided in the face under the skin portions of the cheeks and mouth. A cord means 90 is connected to the skin 22 in the region of the lower lip 88 and extends downwardly and passes under a sheeve 92 mounted on a pin 94 in the chin portion 96 of the mannequin. The cord means 90 attached to the region of the lower lip 88 extends over a sheave 98 and downwardly in the body to a sheeve 100 mounted in brackets 102 on the base 68 and the end of the cord means 90 is attached to the end 104 of a face control lever 106 which is mounted on a bracket 108 on the base plate 68.

The skin 22 over the cheeks 110 and 112 have attached thereto, adjacent to the junction of the cheeks and the lips 86, cord means 114 and 116 which pass behind pins 118 and 120 set in the recesses 122 and 124 under the cheeks 110 and 112 so that the portions of the cord 114 and 116 which are connected to the cheeks 110 and 112 lie substantially parallel to the skin thereof. The cord means 114 is connected to one end of a sheeve block 126 and the cord 116 is connected to one end of the sheeve block 128. Actuating cord means 130 is connected to the end of the block 126 and passes over a sheeve 134 mounted on a pin 136 which, in turn, is mounted in a bracket 138 mounted with the head of the mannequin. Cord means 130 then passes around the sheeve 140 in the block 126 and back to a sheeve 142 over the sheeve 42 mounted on the bracket 144 supported by the bracket 138. Likewise, the operating cord 132 for the left cheek 112 is attached to the rear end of the sheeve block 128 and extends over the sheeve 146 back to the sheeve 148 and then to the sheeve 150 mounted in the bracket 152. Cord means 130 and 132 extend downwardly to the base 68 and engage sheeves 154 and 156 journaled on the sheeve shaft 62. The end of the cords 130 and 132 are then attached to a portion 160 and 162 of the face control lever 106.

Power to control the mannequin is supplied by a motor 170 mounted on the base 68 and connected through a gear train indicated generally at 172 which includes a plurality of belt connected reducing gear wheels which drive a cam shaft 174 mounted in journal blocks 176 and 178. Mounted on the cam shaft 174 is a face control cam 180 which contacts the face control lever 106 and as the cam 180 makes contact with the lever 106, the lever 106 pivots about the pivot point on 108 and tensions the cords 90, 130 and 132. Tensioning the cord 90 pulls down the lower lip 88, showing the simulated teeth within the face of the mannequin and at the same time pulling on the cords 130 and 132 by means of the power increasing block and tackle arrangement, supplies sufficient power to pucker up or gather the cheek portions and pull the corner of the mouth upward to simulate a smiling caricature on the mannequin. The cams 182 and 184 on the shaft 174 alternately energize the eye control levers 76 and 74 and when the cam 184 contacts the lever 74, the cord 50 will be tensioned, pulling the eyes to the right. As soon as the cam 184 has released the lever 74, it will fall back, releasing the tension on the cord 50 but the eyes being unbiased will remain substantially stationary until the cam 182 contacts the lever 76, at which time the cord 52 will be tensioned to pull the eyes to the left.

Obviously, this oscillatory motion of the eyes, or periodic swinging motion, produces a fascinating and alluring effect in the mannequin. Likewise, the tensioning of the cords 90, 130 and 132 produces a smiling effect which is quite pleasant.

Obviously, the cords could be operatively connected to produce other facial effects. Obviously, by pulling the mouth downwardly and producing a dour expression, a crying effect could be produced. Likewise, it would be possible to produce cam actuated devices such as a reservoir and a fluid pump to produce simulated tears in the mannequin.

While for purposes of exemplification, a particular embodiment has been shown and described according to best present understanding thereof, it will be apparent that many changes and modifications can be made therein without departing from the true spirit of the invention.

Having described the invention, what is claimed as new is:

1. A mannequin comprising a body portion and a hollow head portion, said head portion being substantially rigid, a flexible skin simulating covering on said head portion, said head having eye openings therein, simulated eyes pivotally mounted in said eye openings, recesses in said head portion under the covering of the cheeks and adjacent the mouth, said covering being discontinuous at the juncture of the lips, a pad secured to the inner surface of the covering over each of the cheeks and a pad secured to the inner surface of the cover adjacent the lower lip, a motor driven cam shaft, a cam mounted on said shaft, a cam operated smile control lever, two cheek cords and a lip cord connected to said lever, three pulleys mounted below said smile lever, a pulley mounted in the head behind the chin, a pulley in the chin below the lips, said lip cord passing under one of said three pulleys over said back pulley and under said chin pulley and attached to said pad adjacent the lower lip.

2. A mannequin comprising a body portion and a hollow head portion, said head portion being substantially rigid, a flexible skin simulating covering on said head portion, said head having eye openings therein, simulated eyes pivotally mounted in said eye openings, recesses in said head portion under the covering of the cheeks and adjacent the mouth, said covering being discontinuous at the juncture of the lips, a pad secured to the inner surface of the covering over each of the cheeks and a pad secured to the inner surface of the cover adjacent the lower lip, a motor driven cam shaft, a cam mounted on said shaft, a cam operated smile control lever, two cheek cords and a lip cord connected to said lever, three pulleys mounted below said smile lever, a pulley mounted in the head behind the chin, a pulley in the chin below the lips, said lip cord passing under one of said three pulleys over said back pulley and under said chin pulley and attached to said pad adjacent the lower lip, a pair of pulleys mounted in the head back of the cheeks, cheek cords passing under the remaining two of the three pulleys and over said two pulleys mounted back of the cheek and operatively connected to the said cheek pads.

3. A mannequin comprising a body portion, a head and neck portion mounted on said body portion, said head including a face, said portions being hollow, a simulated skin on said mannequin, simulated eyes pivotally mounted in said head for horizontal motion therein, said skin being discontinuous at the lip line, a base mounted in said body, a pair of journal blocks at one end of the base, a cam shaft rotatably mounted in said blocks, means for rotating said cam shaft, a smile control cam and eye control cams on said cam shaft, a smile control lever pivotally mounted on said base for actuation by said smile control cam, a pair of eye control levers pivotally mounted on said base, said eye control cams being positioned to alternately engage the respective eye control levers, a shaft mounted on said base adjacent the ends of said levers, an auxiliary stub shaft mounted on the base adjacent the end of the smile control lever, a sheeve on said shaft at the end of each eye control lever, a pair of sheeves on said shaft adjacent the end of said smile control lever, a sheeve on said stub shaft, cord means attached to each eye control lever, said cord means passing under the respective sheeves and operatively connected to the eyes for alternately moving the eyes in opposite directions, a pair of cord means connected adjacent the end of the smile control lever, said cords each passing under one of said pair of sheeves and being operatively connected to the skin of the cheeks, cord means connected to the end of said smile control lever and extending under the sheeve mounted on said stub shaft, said last mentioned cord means being operatively connected to the skin adjacent the lower lip of the mannequin.

4. A mannequin comprising a body portion, a head and neck portion mounted on said body portion, said head including a face, said portions being hollow, a simulated skin on said mannequin, simulated eyes pivotally mounted in said head for horizontal motion therein, said skin being discontinuous at the lip line, a base mounted in said body, a pair of journal blocks at one end of the base, a cam shaft rotatably mounted in said blocks, means for rotating said cam shaft, eye control cam means mounted on said cam shaft, a pair of eye control levers mounted on said base, rearwardly projecting actuating extensions on said eyes, a cross bar pivotally connecting said extensions for simultaneous operation, cord means operatively connecting said eye control levers to said extensions, said cam means alternately actuating said eye control levers for moving the eyes in alternate directions.

5. A mannequin comprising a hollow body simulating a portion of a human body including a face portion, at least said face portion being provided with a resilient simulated skin, said face having eye openings therein, simulated eyes mounted for movement therein, said simulated skin being discontinuous at the meeting line of the lips, recesses in the body under the skin in the cheek and mouth regions, simulated teeth behind said lips, a sheeve mounted in the chin, cord means attached to said skin in the region of the lower lip, said cord means passing downwardly and under said sheeve, whereby tensioning said cord means draws said lower lip downwardly to open the lips, pins secured in said body behind the cheeks, cord means attached to each cheek adjacent the junction with the upper lip, said cord means passing around said pins whereby a portion of the cord means is substantially parallel to the skin of the cheeks and tensioning of said cord means gathers the cheeks and pulls the corners of the mouth upward.

References Cited in the file of this patent

UNITED STATES PATENTS

| Number | Name | Date |
|---|---|---|
| 685,630 | Nichols | Oct. 29, 1901 |
| 1,140,418 | Talke | May 25, 1915 |
| 1,489,385 | Ciavatti | Apr. 8, 1924 |
| 2,045,962 | Rastetter | June 30, 1936 |
| 2,237,751 | Bunin | Apr. 8, 1941 |
| 2,295,430 | Seewald | Sept. 8, 1942 |